(12) United States Patent
Ragnarsson

(10) Patent No.: US 10,863,754 B2
(45) Date of Patent: Dec. 15, 2020

(54) LOW WATER COFFEE AND TEA BEVERAGE CONCENTRATES AND METHODS FOR MAKING THE SAME

(71) Applicant: Kraft Foods Group Brands LLC, Chicago, IL (US)

(72) Inventor: Karl Ragnarsson, Buffalo Grove, IL (US)

(73) Assignee: Kraft Foods Group Brands LLC, Chicago, IL (US)

(*) Notice: Subject to any disclaimer, the term of this patent is extended or adjusted under 35 U.S.C. 154(b) by 344 days.

(21) Appl. No.: 15/318,717

(22) PCT Filed: Jul. 2, 2015

(86) PCT No.: PCT/US2015/038953
§ 371 (c)(1),
(2) Date: Dec. 14, 2016

(87) PCT Pub. No.: WO2016/004285
PCT Pub. Date: Jan. 7, 2016

(65) Prior Publication Data
US 2017/0119006 A1    May 4, 2017

Related U.S. Application Data

(60) Provisional application No. 62/020,694, filed on Jul. 3, 2014.

(51) Int. Cl.
*A23F 5/24* (2006.01)
*A23F 3/16* (2006.01)
*A23L 2/385* (2006.01)

(52) U.S. Cl.
CPC ............. *A23F 5/243* (2013.01); *A23F 3/163* (2013.01); *A23L 2/385* (2013.01); *A23V 2002/00* (2013.01)

(58) Field of Classification Search
USPC ................................................. 426/594, 658
See application file for complete search history.

(56) References Cited

U.S. PATENT DOCUMENTS

| | | |
|---|---|---|
| 2,340,758 A | 2/1944 | Kappenberg |
| 2,929,150 A | 3/1960 | Johnston |
| 3,962,321 A | 6/1976 | Parliment |
| 4,748,033 A | 5/1988 | Syfert |
| 4,981,699 A | 1/1991 | Inada |
| 5,013,447 A | 5/1991 | Lee |
| 5,690,984 A | 11/1997 | Lim |
| 5,705,205 A | 1/1998 | Brunerie |
| 5,747,081 A | 5/1998 | Lee |
| 5,792,502 A | 8/1998 | Montezinos |
| 5,919,511 A | 7/1999 | Hagiwara |
| 5,928,703 A | 7/1999 | Chmiel |
| 6,242,030 B1 | 6/2001 | Oreilly |
| 6,544,576 B2 | 4/2003 | Zeller |
| 6,669,963 B1 | 12/2003 | Kampinga |
| 6,758,130 B2 | 7/2004 | Sargent |
| 6,835,405 B2 | 12/2004 | Merkt |
| 7,553,509 B2 | 6/2009 | Doerr |
| 8,277,864 B2 | 10/2012 | Tonyes |
| 2001/0019735 A1* | 9/2001 | Cirkel-Egner |
| 2001/0043976 A1 | 11/2001 | Oreilly |
| 2002/0178605 A1 | 12/2002 | Aoki |
| 2002/0192351 A1* | 12/2002 | Cevallos et al. |
| 2004/0086619 A1 | 5/2004 | Zhong |
| 2006/0204633 A1 | 9/2006 | Moore |
| 2007/0009641 A1 | 1/2007 | Erickson |
| 2008/0020115 A1 | 1/2008 | Guerrero |
| 2008/0085349 A1 | 4/2008 | Chen |
| 2008/0226776 A1 | 9/2008 | Roy |
| 2008/0280023 A1 | 11/2008 | Kalenian |
| 2009/0047405 A1 | 2/2009 | Zhang |
| 2009/0232941 A1 | 9/2009 | Farmer |
| 2010/0233322 A1 | 9/2010 | Fukuda |

(Continued)

FOREIGN PATENT DOCUMENTS

| | | |
|---|---|---|
| CA | 1130988 | 9/1982 |
| CN | 88101423 | 10/1988 |

(Continued)

OTHER PUBLICATIONS

International Preliminary Report on Patentability and Written Opinion, International Application No. PCT/US2015/038953, dated Jan. 3, 2017, 7 pages.

(Continued)

*Primary Examiner* — Helen F Heggestad
(74) *Attorney, Agent, or Firm* — Fitch, Even, Tabin & Flannery LLP

(57) ABSTRACT

Low water liquid beverage concentrates and methods for making the concentrates are provided herein. The concentrates include a high coffee and/or tea solids content and total solids content. The amounts of water, total solids, and coffee and/or tea solids are effective to provide a low water beverage concentrate having a pH between about 3.0 to about 6.0. In some approaches, the pH of the low water beverage concentrate changes fewer than about 0.5 pH units after at least three months storage at 70 F in a closed container. The low water beverage concentrates provide a desired flavor profile with little or no flavor degradation after storage at 70 F in a closed container for at least about three months. Methods for making the low water beverage concentrates are also provided.

24 Claims, No Drawings

(56) References Cited

U.S. PATENT DOCUMENTS

2011/0059205 A1    3/2011   Gaysinsky
2011/0123700 A1    5/2011   Peththawadu
2013/0064956 A1    3/2013   Zeller

FOREIGN PATENT DOCUMENTS

| | | |
|---|---|---|
| CN | 1205177 | 1/1999 |
| CN | 101217881 | 7/2008 |
| EP | 0010665 | 5/1980 |
| GB | 2022394 | 12/1979 |
| GB | 2347606 | 9/2000 |
| GB | 2378693 | 2/2003 |
| GB | 2410172 | 7/2005 |
| JP | S61187747 | 8/1986 |
| JP | H01289450 | 11/1989 |
| JP | H07067532 | 3/1995 |
| JP | 2000041578 | 2/2000 |
| WO | 2004030464 | 4/2004 |
| WO | 2004054379 | 7/2004 |
| WO | 2007006352 | 1/2007 |
| WO | 2013036287 | 3/2013 |
| WO | 2013134627 | 9/2013 |

OTHER PUBLICATIONS

International Search Report, International Application No. PCT/US2015/038953, completion date Oct. 5, 2015, 3 pages.

* cited by examiner

LOW WATER COFFEE AND TEA BEVERAGE CONCENTRATES AND METHODS FOR MAKING THE SAME

RELATED APPLICATION

This application claims the benefit of U.S. Provisional Application No. 62/020,694, filed on Jul. 3, 2014, which is incorporated herein by reference in its entirety.

FIELD

The disclosure relates to low water beverage concentrates, and particularly to low water beverage concentrates suitable for dilution with a potable liquid for preparing coffee and/or tea beverages, as well as methods for making the low water beverage concentrates.

BACKGROUND

Coffee concentrates known in the art typically include coffee solids dispersed or dissolved in water. These coffee concentrates are typically sold for commercial use, such as for use by foodservice operators or in vending machines, and are transported and stored at freezer temperatures prior to use to increase shelf life. Products sold in retail are generally 3-5 times concentrated, while those prepared for foodservice applications generally are about 30-65 times concentrated. Some of these coffee concentrates are prepared by partially dehydrating aqueous extracts of coffee solids. Others are prepared by dissolving dried coffee extracts in water. These concentrated products are commonly subjected to thermal processing to improve microbiological stability and increase shelf life due to the large quantity of water in the products.

While these types of coffee concentrates are commercially available, the products suffer from numerous shortcomings related to their composition and handling requirements. For example, these products often are chemically unstable, as generally evidenced by increased acidity and sedimentation, as well as decreased flavor quality, during storage. Aqueous liquid tea concentrates are also known, and these products are similarly prone to flavor degradation and sedimentation during storage. The initial flavor quality may be greatly inferior to freshly-brewed coffee, and shelf life at room temperature is often very short.

Attempts have been made to improve the chemical stability of aqueous coffee concentrates, but the methods generally require use of expensive or complicated processing, chemical treatments, or chemical preservatives. For example, in U.S. Pat. No. 8,277,864, small amounts of sodium hydroxide were added to coffee concentrates to raise the pH. Alternatively, freezing may reduce or prevent some instability problems but at a cost of increased energy consumption and inconvenience because frozen products must be thawed before use. Under some conditions, freezing may also increase reactions or sedimentation because solutions undergo freeze-concentration into a progressively smaller volume of liquid, thereby increasing the potential for solute interactions. Freezing and frozen storage typically require the use of temperatures well below the freezing point of pure water to effectively solidify such freeze-concentrated solutions, further increasing costs and time required for processing and thawing.

SUMMARY

Low water liquid beverage concentrates and methods for making the concentrates are provided. In one aspect, the liquid beverage concentrates provided herein contain coffee and/or tea solids and can be diluted in water or other aqueous liquid, such as milk, to provide a coffee or tea beverage. It was surprisingly found that the occurrence of flavor degradation reactions and transformations (often caused by dissociated acids, including acids naturally present in coffee or tea solids) was significantly reduced so that product quality was greatly improved and shelf life increased as compared to otherwise identical concentrates with a higher water content.

In one approach, a low water beverage concentrate is provided that comprises about 5 to about 40 percent total water; about 20 to about 80 percent low water liquid; and about 5 to about 60 percent coffee and/or tea solids. The amounts of water, low water liquid, and coffee and/or tea solids are effective to provide a low water beverage concentrate having a pH between about 3.0 to about 6.0, and the pH of the low water beverage concentrate changes less than about 0.5 pH units after 12 months storage at 70° F. in a closed container.

In another approach, a low water beverage concentrate is provided that comprises up to about 60 percent total water; about 15 to about 70 percent total solids; and about 5 to about 60 percent coffee and/or tea solids. The amounts of water, total solids, and coffee and/or tea solids are effective to provide a low water beverage concentrate having a water activity of about 0.6 to about 0.95 and a pH between about 3.0 to about 6.0. The amounts of water, total solids, and coffee and/or tea solids are also effective to prevent the pH of the low water beverage concentrate from changing more than about 0.5 pH units after 12 months storage at 70° F. in a closed container.

In one aspect, the concentrate may comprise about 20 to about 70 percent low water liquid. In one aspect, the low water beverage concentrate may have a total water content of about 15 to about 40 percent. In another aspect, the low water beverage may have a total solids content of about 30 to about 70 percent.

In yet another aspect, the low water beverage concentrate may include water, total solids, and coffee and/or tea solids in amounts effective to provide the concentrate with a pH that changes fewer than about 0.1 pH units.

In another aspect, the low water concentrate may comprise, and/or any low water liquid included in the low water concentrate, may comprise at least one of the group consisting of sugar alcohol, fructose syrup, glucose syrup, sucrose syrup, lactose syrup, carbohydrate syrup, honey, agave syrup, monosaccharides, disaccharides, and combinations thereof. When included, this component may contribute to the total solids content of the concentrate.

In one aspect, the low water liquid may comprise at least one non-aqueous liquid of the group consisting of glycerol, propylene glycol, 1,3-propanediol, ethanol, triacetin, ethyl acetate, benzyl alcohol, vegetable oil, vitamin oil, and isopropanol.

In another aspect, the coffee and/or tea solids may comprise at least one of the group consisting of freeze-dried coffee, spray-dried coffee, spray-dried tea, freeze dried tea, roast coffee, instant coffee powder, instant tea powder, roast coffee beans, cold brewed tea solids, cold brewed coffee solids, agglomerated coffee solids, coffee extract, tea extract, botanical extract, ground tea leaves, and combinations thereof. In yet another aspect, the coffee and/or tea solids comprise spray-dried coffee. In some approaches, the low water concentrate includes coffee solids and does not include tea solids.

The concentrate may also comprise about 10 to about 40 percent coffee and/or tea solids, in another aspect about 10 to about 30 percent coffee and/or tea solids. In some aspects, the concentrate may include about 15 to about 70 percent total solids. In yet other approaches, the concentrate may further comprise up to about 5 percent high intensity, non-nutritive sweetener solids. In some approaches, the concentrate can be diluted with water or other potable aqueous liquid at a ratio of concentrate to water or potable aqueous liquid about 1:30 to about 1:130 to provide a finished beverage having a coffee and/or tea solids content of about 0.1 to about 3.0 percent by weight of the finished beverage.

In yet another approach, a method of preparing a low water beverage concentrate is provided. The method includes providing a pre-concentrate comprising coffee and/or tea solids in water; and mixing about 10 to about 75 percent pre-concentrate by weight of the low water beverage concentrate with about 25 to about 90 percent low water liquid by weight of the low water concentrate. The amounts of pre-concentrate and low water liquid are effective to provide a low water beverage concentrate having a pH between about 3.0 to about 6.0, and the pH of the low water beverage concentrate changing fewer than about 0.5 pH units after 3 months storage at 70° F. in a closed container.

In one aspect, the low water beverage concentrate includes about 5 to about 60 percent coffee and/or tea solids by weight of the beverage concentrate. In another aspect, the concentrate includes about 15 to about 70 percent total solids. In another aspect, the low water beverage concentrate has a total water content of about 5 to about 40 percent by weight of the concentrate. In yet another aspect, the low water liquid is included in an amount of about 20 to about 80 percent by weight of the concentrate.

The low water liquid may comprise at least one of the group consisting of sugar alcohol, fructose syrup, glucose syrup, sucrose syrup, lactose syrup, carbohydrate syrup, honey, agave syrup, monosaccharides, disaccharides, and combinations thereof. In another approach, the low water liquid may comprise at least one of the group consisting of glycerol, propylene glycol, 1,3-propanediol, ethanol, triacetin, ethyl acetate, benzyl alcohol, vegetable oil, vitamin oil, and isopropanol.

In some approaches, the concentrate further comprises up to about 5 percent high intensity, non-nutritive sweetener solids.

In some aspects, the concentrate can be diluted with water or other potable aqueous liquid at a ratio of concentrate to water or potable aqueous liquid about 1:30 to about 1:130 to provide a finished beverage having a coffee and/or tea solids content of about 0.1 to about 3.0 percent by weight of the finished beverage.

In one approach, coffee and/or tea solids are combined with water or other aqueous liquid to form a liquid coffee and/or tea pre-concentrate prior to incorporation into the beverage concentrate. These pre-concentrates may be included in the beverage concentrate in an amount greater than the amount of any individual LWL or any other non-water, non-coffee or non-tea ingredient.

At least in some approaches, the beverage concentrates have a pH of about 3.0 to about 7.0, in another aspect a pH of about 4.0 to about 6.0, and in another aspect a pH of about 4.5 to about 5.5 as measured within one day of being produced and stored in a closed container at 70° F. In one aspect, the pH of the beverage concentrate is stable during the shelf life of the concentrate. For example, the pH may change by less than about 1.0 pH units, in another aspect less than about 0.5 pH units, and in another aspect less than about 0.1 pH units, when stored in a closed container at 70° F. for at least about five days, in another aspect at least about one week, in another aspect at least about three months, in another aspect at least about six months, in another aspect at least about eight months, and in another aspect at least about twelve months.

The low water liquid beverage concentrates may also include a number of other ingredients, if desired, such as preservatives, natural or artificial flavors, non-nutritive sweeteners, buffers, salts, nutrients, surfactants, emulsifiers, stimulants, antioxidants, preservatives, crystallization inhibitors, natural or artificial colors, viscosifiers, antioxidants, caffeine, electrolytes (including salts), nutrients (e.g., vitamins and minerals), stabilizers, gums, and the like. Flavorings may also be included, if desired. The amount of flavoring included can be determined by one of skill in the art and may depend, at least in part, on the desired strength of the flavor in the finished beverage and/or on the intended dilution factor of the beverage concentrate necessary to provide the finished beverage. In one approach, about 0.01 to about 40 percent flavoring can be added, in another aspect about 1 to about 20 percent flavoring.

It was surprisingly found that the occurrence of flavor degradation reactions and transformations (often caused by dissociated acids, including acids naturally present in coffee or tea solids) was significantly reduced in the low water liquid beverage concentrates described herein such that product quality was greatly improved and shelf life increased as compared to concentrates with higher water content.

DETAILED DESCRIPTION

Provided herein are low water liquid beverage concentrates and methods for making the concentrates. As used herein, the term "beverage concentrate" means a liquid composition that can be diluted with an aqueous, potable liquid to provide a beverage. In particular, the liquid beverage concentrates provided herein contain coffee and/or tea solids and can be diluted in water or other aqueous liquid, such as milk, to provide a coffee or tea beverage. For example, the beverage concentrate can be diluted in a cold or hot aqueous liquid, depending on consumer preference, to prepare a beverage that mimics an iced or freshly brewed coffee or tea beverage. Therefore, the beverage concentrates provided herein can be used to conveniently prepare coffee and tea beverages without the need for coffee brewing equipment and without the need to thaw frozen coffee or tea concentrates in order to prepare the finished beverage. The concentrates described herein also can be combined with a variety of food products to add coffee and/or tea flavor to the food products. For example, the concentrates described herein can be used to provide coffee and/or tea flavor to a variety of solid, semi-solid, and liquid food products. Appropriate ratios of the beverage concentrate to food product or beverage can readily be determined by one of ordinary skill in the art.

At least in one approach, a low water beverage concentrate is provided that includes up to about 60 percent total water; about 15 to about 70 percent total solids; and about 5 to about 60 percent coffee and/or tea solids. The amounts of water, total solids, and coffee and/or tea solids in the concentrate are effective to provide a low water beverage concentrate having a water activity of about 0.6 to about 0.95 and a pH between about 3.0 to about 6.0. The amounts of water, total solids, and coffee and/or tea solids are also effective to prevent the pH of the low water beverage concentrate from changing more than about 0.5 pH units after 12 months storage at 70° F. in a closed container.

As used herein, the term "low water" when used in reference to the beverage concentrate means that the beverage concentrate includes a total water content of about 0.5 to about 60 percent, in another aspect about 5 to about 40 percent, in another aspect about 15 to about 40 percent by weight, in another aspect about 25 to about 40 percent by weight, in another aspect about 30 to about 40 percent by weight, and in yet another aspect about 33 to about 40 percent by weight of the beverage concentrate. The total water content includes any sources of water in the concentrate, including for example water present in any liquids, such as liquid fructose or liquid flavoring, added to the concentrate.

The beverage concentrates may include one or more liquids that include no water or low amounts of water in order to limit the total amount of water included in the beverage concentrates. By doing so, unwanted chemical reactions, which can result in flavor degradation and increased rate of sedimentation, are significantly reduced or prevented, thereby greatly improving the shelf life of the concentrates relative to otherwise identical concentrates having a higher total water content.

As used herein, the term "low water liquid" or "LWL"—when used in reference to an ingredient of the liquid beverage concentrate and not the concentrate itself—refers to a liquid ingredient of the beverage concentrate, e.g., fructose syrup, that includes less than about 40 percent water, in another aspect less than about 20 percent water, in another aspect less than about 10 percent water, and in yet another aspect less than about 5 percent water. The term "LWL" also includes liquids containing very little water content, which are referred to herein by the terms "non-aqueous liquid" or "NAL." A non-aqueous liquid is a liquid ingredient of the beverage concentrate that includes no more than a trivial amount of water, such as no more than about 2 percent water, in another aspect no more than about 1 percent water, and in another aspect no more than about 0.1 percent water. In some approaches, the LWL used in the beverage concentrates may comprise an NAL diluted in water. The term "liquid" refers to a non-gaseous, flowable, fluid composition at room temperature (i.e., about 70° F.).

Instead of or in addition to including a LWL, one could include water and a quantity of solids to effectively provide a LWL and desired total water content within the concentrate. For example, instead of including liquid fructose as an ingredient, one could include water and dry fructose. The total solids and total water content, as well as other features described herein, of such concentrates would be the same as described herein. Accordingly, the weight percentages described herein with respect to LWL apply equally to embodiments where water and non-coffee and non-tea solids are combined when forming the beverage concentrates.

For example, at least in some approaches, the low water concentrates provided herein include about 20 to about 90 percent low water liquid, in another aspect about 20 to about 80 percent low water liquid, in another aspect about 20 to about 70 percent low water liquid, in another aspect about 20 to about 50 percent low water liquid, in another aspect about 20 to about 40 percent low water liquid, and in another aspect about 25 to about 35 percent low water liquid. When one or more NAL are included, the amount of low water liquid in the concentrate includes the amount of NAL plus any separately added water.

The amount of water and coffee and/or tea solids included in the low water concentrates will depend at least in part on the desired concentration factor of the concentrates. To prepare aqueous beverages for consumption, the concentrates can be combined with water or other potable liquid at a weight ratio of water to concentrate of about 5:1 to about 300:1, in another aspect about 10:1 to about 300:1, in another aspect about 20:1 to about 200:1, in another aspect about 30:1 to about 130:1, and in another aspect about 30:1 to about 90:1. Other concentrations may also be used if desired. For example, low water concentrates having a lower concentration factor may be combined with water or other potable liquid at a weight ratio of water to concentrate of about 5:1 to about 30:1, in another aspect about 5:1 to about 25:1, in another aspect about 5:1 to about 20:1, in another aspect about 5:1 to about 15:1, in another aspect about 5:1 to about 12:1, and in another aspect about 7:1 to about 12:1.

Coffee beverages are typically consumed with a solids content of about 0.6 to about 1.5 percent by weight of the beverage, while tea beverages are typically consumed with a solids content of about 0.1 to about 0.5 percent by weight of the beverage. By some approaches, the dilution factor of the concentrate used to provide the finished beverage may depend, at least in part, on the desired flavor intensity, solids content, and/or viscosity of the concentrate. The dilution factor of the concentrate can also be expressed as the amount necessary to provide a single serving of concentrate. In one approach, when the beverage concentrate is diluted with water or other potable aqueous liquid, the finished beverage has a coffee and/or tea solids content of about 0.1 to about 5 percent, in another aspect about 0.1 to about 3 percent, in another aspect about 0.2 to about 3 percent, in another aspect about 0.2 to about 2 percent, in another aspect about 0.4 to about 1.5 percent, in another aspect about 0.5 to about 1.5 percent, in another aspect about 0.7 to about 1.5 percent, in yet another aspect about 0.7 to about 1.2 percent by weight of the finished beverage. The amount of coffee and/or tea solids in the finished beverage may depend, at least in part, on the desired flavor intensity provided to the finished beverage, as well as on the type of coffee and/or tea solids used. The coffee and/or tea solids content in the finished beverage may also depend, at least in part, on whether the beverage may be further diluted, such as by the melting of any ice added to the beverage. For example, more strongly flavored coffee and/or tea solids may be included in lesser quantities and still provide the desired flavor. The amount of coffee and/or tea solids in the finished beverage may also depend on the solubility of the coffee and/or tea solids in the low water concentrate. For instance, when a lesser quantity of coffee and/or tea solids is desired in the final beverage, the final beverage may include, for example, about 0.3 to about 1.0 percent coffee and/or tea solids, in another aspect about 0.4 to about 1.0 percent coffee and/or tea solids, and in another aspect about 0.4 to about 0.8 percent coffee and/or tea solids. In other aspects, when a higher amount of coffee and/or tea solids is desired in the low water concentrate, the final beverage may include, for example, about 1.0 to about 1.7 percent coffee and/or tea solids, in another aspect about 1.0 to about 1.5 percent coffee and/or tea solids, and in another aspect about 1.2 to about 1.5 percent coffee and/or tea solids. In some aspects, the beverage concentrates include coffee solids and specifically exclude tea solids.

The beverage concentrates provided herein also include a relatively high percentage of coffee and/or tea solids. In one approach, the concentrates include about 5 to about 60 percent coffee and/or tea solids, in another aspect about 5 to about 40 percent coffee and/or tea solids, in another aspect about 10 to about 40 percent coffee and/or tea solids, in another aspect about 10 to about 30 percent coffee and/or tea solids, and in another aspect about 15 to about 30 percent coffee and/or tea solids. Generally the coffee and/or tea solids included in the beverage concentrates contain chemical constituents that are soluble and/or dispersible in the concentrate, and which collectively comprise flavor and/or aroma characteristics of coffee or tea. Suitable coffee and/or tea solids specifically include freeze-dried coffee, freeze-dried tea, spray-dried coffee, spray-dried tea, roast coffee, instant coffee powder, instant tea powder, roast coffee beans, concentrated coffee extract, concentrated tea extract, cold brewed coffee solids, cold brewed tea solids, agglomerated coffee solids, and combinations thereof but other sources of coffee and/or tea solids may also be used, if desired. In one aspect, spray-dried coffee and tea products are preferred over freeze-dried products, as the spray-dried products have been found to have greater solubility in water than in freeze-dried products.

The total solids content of the beverage concentrates generally range from about 15 percent to about 75 percent, about 15 percent to about 70 percent, in another aspect about 30 percent to about 70 percent, in another aspect about 40 to about 70 percent, in another aspect about 30 to about 60 percent, and in another aspect about 40 percent to about 50 percent. In some approaches, the most abundant source of solids is the coffee and/or tea solids. Also, many LWL will contribute solids to the total solids content of the concentrates. For example, liquid fructose syrup may contain about 80 percent solids.

By balancing the amounts of total water, coffee and/or tea solids, and total solids, as well as the water activity of the concentrates, it was surprisingly found that the occurrence of flavor degradation reactions and transformations (often caused by dissociated acids, including acids naturally present in coffee or tea solids) was significantly reduced so that product quality was greatly improved and shelf life at room temperature increased as compared to concentrates with higher water content and lower total solids. Without wishing to be limited by theory, it is presently believed that water, which typically is the major component of currently available aqueous coffee and tea concentrates, causes or enables the chemical reactions that cause flavor degradation during storage. For example, acids, such as may be extracted from coffee or tea solids, do not readily dissociate in NALs to release their hydrogen ions, which may cause or catalyze chemical reactions or further lower the pH of the beverage concentrates. Acidity in coffee and tea may vary based on coffee type (e.g., *Arabica* coffee, *Robusta* coffee, black tea, green tea, white tea, and the like). It is believed that coffee may contain over twenty-five different acids, including chlorogenic, malic, citric, acetic, formic, glycolic, lactic, and pyro-glutamic acid. Acids found in tea include, for example, tannic, gallic, chlorogenic, oxalic, malonic, succinic, malic, acetic, and citric acid. Solubilizing coffee or tea solids in a solvent will release some of these acids immediately and others will be released over time, thereby reducing the pH of the concentrate during the product's shelf life.

It was surprisingly found that the concentrates do not need to be substantially free of water in order to improve the stability of coffee and/or tea flavors in the concentrates. It was unexpectedly found that replacing relatively small quantities of water with one or more LWLs can result in substantial reductions in the acid dissociation constant ($K_a$) of acids present in the coffee or tea solids, thereby enhancing the stability of flavors in the coffee and/or tea solids that are susceptible to acid degradation. Advantageously, the inclusion of water also provides increased solubilization of the coffee and/or tea solids, which generally are more soluble in water or LWL than in NAL. Further, in some approaches, a LWL, such as liquid fructose, may be better able to solubilize coffee and/or tea solids than a similar amount of NAL, such as glycerol, in the beverage concentrate.

Acids have lower $K_a$ values in organic liquids, such as NAL, than in water. Because the relationship between the $K_a$ of an acidulant and the solvent is logarithmic, a particular acidulant having a $K_a$ value of about $10^{-3}$ in water might have a $K_a$ value of about $10^{-8}$ in an NAL like propylene glycol. For the low water systems described herein, the acidulants are dissolved in the water or LWL, which results in $K_a$ values which would generally be somewhere between the acidulant's $K_a$ value in pure water and its $K_a$ value in NAL. It was surprisingly found that these intermediate $K_a$ values result in far less acid dissociation, higher pH, and less acid mediated degradation of flavors in the beverage concentrate than expected despite the presence of water. Even though acids may dissolve in NAL, it is believed that protons in acidic carboxyl groups only weakly dissociate, relative to their dissociation in water, or dissociate while remaining in close proximity to carboxyl anions, to beneficially lower free proton concentration and potential to cause or promote chemical reactions. Further, the low concentration of water in the described beverage concentrates reduces the formation of highly reactive strongly-acidic hydronium ions present in much higher concentration in acid-containing aqueous solutions. Without being limited by theory, it is believed lowered acid $K_a$ and free-proton concentration in beverage concentrates containing added acids or acids found naturally in coffee or tea solids greatly slow, or prevent, unwanted chemical reactions to beneficially improve flavor stability and thereby improve product quality and increase shelf life.

The water activity of the concentrates also plays a role in the rate at which unwanted chemical reactions occur. Therefore, at least in some approaches, the ingredients in the low water concentrates are provided in amounts effective to provide a water activity of about 0.6 to about 0.95, in another aspect about 0.65 to about 0.92, in another aspect about 0.65 to about 0.85, and in another aspect about 0.65 to about 0.8.

Because any acids present in the low water concentrates will be less dissociated than in aqueous concentrates having higher free water content, the products may be formulated to include acid sensitive ingredients without adverse effect, or with diminished adverse effect, compared to their use in aqueous concentrates. For example, coffee beverage concentrates can be formulated with certain acid-sensitive flavors, sweeteners, or milk powders to provide flavored, sweetened, or milky prepared beverages that could not otherwise be produced from aqueous concentrates to provide acceptable flavor, appearance, or shelf life.

Further, it is known that lactones present in aqueous coffee concentrates are hydrolyzed by water, which results in lowering pH and increasing sourness. Also, mannan polymers present in such products are known to crystallize and precipitate in water. Further, many labile flavors are known to react, either with water or in water, to produce compounds having decreased flavor impact or off-flavors. Tannins present in aqueous tea concentrates may precipitate during storage, especially if hard water is used to formulate the products.

The amounts of total water, coffee and/or tea solids, and total solids included in the beverage concentrates are balanced to provide a desired flavor profile with little or no degradation of the coffee and/or tea flavors in the coffee and/or tea solids when stored in a closed container at 70° F. for at least about five days, in another aspect at least about one week, in another aspect at least about three months, in another aspect at least about six months, in another aspect at least about eight months, and in another aspect at least about twelve months. The amounts of these ingredients may also be balanced to provide the desired solubility of the coffee and/or tea solids in the beverage concentrate. It was surprisingly found that inclusion of the total amount of water in the low water beverage concentrates described herein in combination with the total amount of solids and coffee and/or tea solids is effective to markedly improve the solubility of the coffee and/or tea solids in the beverage concentrates without the expected significant pH reduction resulting from solubilization of acids naturally in the coffee and/or tea solids. At least in some approaches, use of the claimed total water content also beneficially reduces any off flavors associated with large amounts of non-aqueous liquids.

At least in some approaches, the beverage concentrates have a pH of about 3.0 to about 7.0, in another aspect a pH of about 4.0 to about 6.0, and in another aspect a pH of about 4.5 to about 5.5, and in another aspect about 4.3 to about 5.0 as measured within one day of being produced and stored in a closed container at 70° F. Further, at least in some approaches, it has surprisingly been found that the beverage concentrates provided herein are pH stable without the need for addition of an alkali source to raise the pH during preparation of the concentrates in order to compensate for any decrease in pH due to release of acids from the coffee and/or tea solids during storage. Advantageously, the pH of the beverage concentrate is stable during the shelf life of the concentrate. In one aspect, the pH changes by less than about 1.0 pH units, in another aspect less than about 0.5 pH units, and in another aspect less than about 0.1 pH units, when stored in a closed container at 70° F. for at least about five days, in another aspect at least about one week, in another aspect at least about three months, in another aspect at least about six months, in another aspect at least about eight months, and in another aspect at least about twelve months. In some aspects, addition of an alkali source or other buffering agent to raise the pH of the beverage concentrates is specifically excluded. The term alkali source, as used herein, refers to a compound containing a source of hydroxide ions, such as sodium hydroxide, calcium hydroxide, potassium hydroxide, but specifically excludes water. The alkali source may also be a buffer. Suitable buffers include, for example, a conjugated base of an acid (e.g., sodium citrate and potassium citrate), acetate, phosphate or any salt of an acid. In other instances, an undissociated salt of the acid can buffer the concentrate.

If desired, additional coffee solids, such as micro ground coffee or tea, can be added to the beverage concentrates for added mouthfeel and flavor. For example, about 0.05 to about 20 percent, in another aspect about 0.1 to about 15 percent, in another aspect about 0.2 to about 10 percent, in another aspect about 0.3 to about 8 percent micro ground coffee or tea could be added by weight of the low water concentrate. Micro ground coffee may also be referred to as ground colloidal particles of roast or extracted roast coffee, or "colloidal coffee" for short. Generally, the colloidal coffee has a mean particle size of about 3 to about 10 microns. See, e.g., U.S. Pat. No. 3,652,292, which is incorporated herein by reference.

Other sources of botanical solids may also be included, if desired, such as botanical extracts or other solids derived from cinnamon bark, ginger root, clove buds, cardamom pods, rosemary needles, orange peel, hibiscus, chamomile, rose flowers, lemongrass stalks, cocoa nibs, yerba mate, chicory, and combinations thereof. Generally it is desired that the botanical solids are soluble and/or dispersible in the concentrate. Alternatively, botanical solids may be included without also including coffee and/or tea solids. In those embodiments, the references to total coffee and/or tea solids herein are then equally applicable to the discussion of botanical solids.

The coffee and/or tea solids may be included in the concentrates in a variety of forms, including dissolving, dispersing, and/or suspending the coffee and/or tea solids in the concentrate or by pre-mixing the coffee and/or tea solids with one or more other ingredients of the beverage concentrate. Although not required, it has been found to be advantageous to dissolve, disperse, and/or suspend the coffee and/or tea solids, as well as any other botanical solids used in the concentrate, in an aqueous liquid, preferably water, to form a liquid coffee and/or tea pre-concentrate prior to preparing the beverage concentrate. It has been found that the coffee and/or tea solids tend to be more soluble in water or aqueous liquids with a high water content (e.g., more than about 70 percent water) than in LWL.

In one approach, when liquid coffee and/or tea extracts, or alternatively coffee and/or tea solids are combined with water or other aqueous liquid to form a liquid coffee and/or tea pre-concentrate prior to incorporation into the beverage concentrate, these liquid extracts or pre-concentrates are included in the beverage concentrate in an amount greater than the amount of any individual LWL or any other non-water, non-coffee or non-tea ingredient. In this respect, the liquid extract or pre-concentrate is the ingredient included in the greatest amount in the beverage concentrate and could be listed as the first ingredient in an ingredient listing on a product label for the beverage concentrate. The terminology referred to as the first item in the ingredient listing could be any that encompasses a combination of aqueous liquid and coffee solids and/or tea solids, such as coffee concentrate, concentrated coffee, tea concentrate, concentrated tea, or the like. In one approach, liquid coffee extract and/or liquid tea extract is used in place of coffee and/or tea solids.

Suitable LWLs may include, for example, sugar alcohol, fructose syrup, agave syrup, sugars (e.g., monosaccharides, disaccharides), glucose syrup, sucrose syrup, lactose syrup, carbohydrate syrup, honey, non-aqueous liquid diluted with water, and combinations thereof. For example, high fructose syrup generally includes about 20 percent water. For example, suitable NALs include, but are not limited to, propylene glycol, glycerol, triacetin, ethanol, ethyl acetate, benzyl alcohol, vegetable oil, vitamin oil, isopropanol, 1,3 propanediol, sugar alcohol (e.g., sorbitol, mannitol, xylitol, erythritol, lactitol, and maltitol), and combinations thereof. At least in some approaches, the NAL specifically excludes coffee oil. In one aspect, the selection of LWL or NAL may depend, at least in part, on the ability of the NAL to solubilize ingredients of the concentrate or to form an emulsion with other ingredients of the concentrate. The total amount of NAL in the beverage concentrate includes the weight of any non-volatile NAL ("NV-NAL") and/or volatile NAL ("V-NAL") used to formulate the concentrate, plus any NAL present in optional other ingredients, such as liquid flavors, used to formulate the concentrate. As noted above, the LWL can be provided as an ingredient in the beverage concentrate or it can be created by combining solids and water to provide the equivalent of a LWL in the beverage concentrate. For example, the solids could include sugars (e.g., monosaccharides, disaccharides) or salts (e.g., NaCl or KCl).

NALs utilized in the concentrates described herein may be either protic or aprotic NALs. As used herein, protic NALs possess one or more hydroxyl groups having an ionizable hydrogen atom while aprotic NALs do not. Individual protic or aprotic NALs may be either volatile or non-volatile. In general, food acids dissolved in aprotic NALs will dissociate to a lesser extent than the same acids dissolved in protic NALs, and acids dissolved in NAL mixtures will dissociate to intermediate extents in general proportion to the compositions and levels of NALs present. NALs can be selected to advantageously control the extent of acid dissociation and pH of the beverage concentrates created using solid flavor sources which naturally include acids and/or added acids.

Suitable V-NALs that can be used herein include, but are not limited to, ethanol, ethyl acetate, benzyl alcohol, propanol, or mixtures thereof. Supercritical fluids, such as supercritical carbon dioxide, may also be utilized. As used herein, V-NALs are liquids that have a boiling point less than water (i.e., at about 100° C. at ambient atmospheric pressure). NV-NALs that can be used include, but are not limited to, glycerol, propylene glycol, 1,3-propanediol, polyethylene glycol, polyglycerol, polyglycerol ester, triacetin, vegetable oil, or combinations thereof. As used herein, NV-NALs are liquids that either do not boil or have a boiling point greater than water at ambient atmospheric pressure. Of NV-NALs that boil, it may be desirable to use those having a high enough boiling point to limit the evaporation of the NAL from a prepared hot beverage to reduce the likelihood of adversely impacting the perceived beverage quality. For example, inclusion of NV-NAL having a boiling point of higher than about 150° C., in another aspect higher than about 200° C., and in another aspect higher than 300° C., may be desirable.

At least in some aspects, use of NALs having relatively bland flavor and aroma may be desirable to limit any potential adverse effect on the organoleptic quality of beverages prepared with the concentrates. Prolic NV-NALs that are particularly suited because of their generally bland flavor and compatibility with foods include, for example, glycerol, propylene glycol, and 1,3-propanediol. Aprotic NV-NALs that may be utilized for generally the same reasons include, for example, triacetin and vegetable oils, such as coffee oil or medium-chain triglyceride oils.

In some approaches, it may also be desirable to reduce or eliminate the amount of V-NAL in the beverage concentrates, particularly any V-NAL having inherent flavor or odor that may not be desired in prepared beverages. Doing so generally beneficially increases the flash point of the concentrate and beneficially decreases the potential for V-NAL to adversely impact flavor and aroma of prepared beverages. In one aspect, the concentrate includes less than about 20 percent V-NAL, in another aspect less than about 15 percent V-NAL, in another aspect less than about 10 percent V-NAL, in another aspect less than about 5 percent V-NAL, in another aspect less than about 1 percent V-NAL, and in yet another aspect 0 percent V-NAL.

By one approach, a variety of additional ingredients can be included in the beverage concentrates. The amount, identity, and combination of the additional ingredients are not particularly limited so long as the desired solids content, flavor, and stability of the ingredients of the concentrate are maintained. The amount of the additional ingredients included may also depend on the ability to solubilize or disperse the ingredients in the LWL. Further, certain ingredients, such as salts, may be more stable in terms of delaying or preventing precipitation when the concentrate includes lower amounts of water.

The concentrates may further include additional optional ingredients in solid or liquid form, such as but not limited to preservatives, natural or artificial flavors, non-nutritive sweeteners, buffers, salts, nutrients, surfactants, emulsifiers, stimulants, antioxidants, preservatives, crystallization inhibitors, natural or artificial colors, viscosifiers, antioxidants, caffeine, electrolytes (including salts), nutrients (e.g., vitamins and minerals), stabilizers, gums, and the like. Preservatives, such as EDTA, sodium benzoate, potassium sorbate, sodium hexametaphosphate, raisin, natamycin, polylysine, and the like can be included, if desired. For example, benzoate and/or sorbate salts may also be included, if desired. Generally, benzoate and/or sorbate salts could be included in amounts of up to about 0.1 percent each.

In some approaches, flavorings may be added to the concentrates, if desired. The amount of flavoring included can be determined by one of skill in the art and may depend, at least in part, on the desired strength of the flavor in the finished beverage and/or on the intended dilution factor of the beverage concentrate necessary to provide the finished beverage. In one approach, about 0.01 to about 40 percent flavoring can be added, in another aspect about 1 to about 20 percent flavoring. Many commercially available flavorings include a relatively high concentration of NAL. For example, many commercially available flavorings include diols or polyols, such as glycerol, ethanol, or propylene glycol. In some approaches, it may be desirable to include flavorings which provide hazelnut, almond, vanilla, caramel, Irish cream, toffee, butterscotch, chocolate, or amaretto flavor notes to the beverage concentrate. Generally, extruded and spray-dried flavorings may be included in the concentrates in lesser amounts than flavor emulsions or diol/polyol-containing flavorings, as extruded and spray-dried flavorings often include a larger percentage of the flavor component which provides the characteristic flavor to the flavoring (i.e., flavor key). When such flavorings are included in the concentrates described herein, the NAL or LWL content of the flavorings is included in the calculation of the total NAL or LWL content of the concentrate. For example, if a flavoring includes 80 percent propylene glycol and the flavoring is included in the concentrate in an amount of 30 percent, the flavoring contributes 24 percent propylene glycol to the total NAL or LWL content of the concentrate.

In one aspect, the beverage concentrates may further comprise added salts, such as sodium chloride, potassium chloride, sodium citrate, mono sodium phosphate, magnesium chloride, calcium chloride, the like, and combinations thereof. Salts can be added to the concentrate to provide electrolytes, which is particularly desirable for sports-type or health drinks. The salts may also be included to lower the water activity of the concentrates and/or enhance the flavor profile of the concentrates. For example, sodium lactate, or other salts, may be used to provide a nutritive source of minerals or for pH buffering. For example, up to about 10 percent salt can be included. In another aspect, up to about 4 percent salt can be included, and in another aspect up to about 2 percent salt can be included.

The beverage concentrates may also comprise added acids, such as glucona delta lactone, malic acid, gluconic acid, lactic acid, phosphoric acid, citric acid, and propionic acid. Generally up to about 15 percent added acid may be included. For example, addition of acid may be desired when providing a beverage concentrate with tea solids and lemon flavoring. For example, the addition of the acid may enhance the lemon flavor of the tea concentrate by providing the tartness that is characteristic of lemon juice.

Further, up to about 5 percent non-nutritive sweetener may be included, if desired. Useful non-nutritive sweeteners, including both low intensity and high intensity sweeteners, such as, for example, sucralose, aspartame, *stevia*, saccharine, monatin, luo han guo, neotame, sucrose, Rebaudioside A (often referred to as "Reb A"), cyclamates (such as sodium cyclamate), acesulfame potassium, and combinations thereof. Generally nutritive sweeteners (e.g., honey, corn syrup, high fructose corn syrup, and the like) may also be included. Liquid nutritive sweeteners may be characterized as LWL due to the water content of the sweeteners. For purposes herein, the percentage of non-nutritive sweetener is the percentage of sweetener solids exclusive of carriers (e.g., maltodextrin) or solvent (e.g., liquid sucralose contains water as a solvent). Particularly for concentrates having a lower concentration factor (e.g., less than 30×), the content of sweetener solids included in any low water liquid included in the concentrate may be sufficient to provide the desired level of sweetness to the concentrate without needing to add a non-nutritive sweetener.

Artificial colors, natural colors, or a combination thereof may be included, if desired, in the range of 0 to about 15 percent, in another aspect about 0.005 to 10 percent, in another aspect about 0.005 to 5 percent, and in yet another aspect in the range of about 0.005 to 1 percent, if desired. In formulations using natural colors, a higher percent by weight of the color may be needed to achieve desired color characteristics.

Further, ingredients may optionally be included that impart creaminess or whitening characteristics to the beverage made with the concentrate. Such ingredients include but are not limited to liquid or powdered dairy or non-dairy creamers, any milk concentrate, powder or protein, milk substitutes, such as soy concentrates, powders, or proteins, or combinations thereof.

Viscosity

Further, it is believed that the much higher viscosity of NALs and LWL relative to water likely greatly slows such reactions and transformations, even if small amounts of water are present in the beverage concentrates. Physical properties of several NALs and LWLs are provided in Table I below. It can be seen that, in general, LWLs and NV-NALs typically have much higher viscosity, density, and boiling point than water or ethanol (V-NAL). Accordingly, beverage concentrates prepared from LWLs, such as those including non-volatile NALs, typically have much higher viscosity, higher density, and lower volatility than corresponding concentrates including the same coffee and/or tea solids at the same levels, but where water or ethanol are utilized instead of non-volatile NAL or other LWL. In some cases, high LWL (including NAL) viscosity can limit the amount of coffee and/or tea solids that can be dissolved, dispersed, or dispensed, but higher viscosity may be a benefit in some product applications and may be controlled by selection of LWL used, either alone or in combination, to formulate the concentrates, or by use of some water and/or ethanol in combination with LWL to lower viscosity.

TABLE I

Approximate Physical Properties of Non-Aqueous and Low Water Liquids at Room Temperature

| Liquid | Viscosity (cP) | Density (g/cc) | Boiling Point (° C.) |
|---|---|---|---|
| Approximate Physical Properties of Non-Aqueous Liquids (at 20° C.) | | | |
| Water | 1 | 1.00 | 100 |
| Ethanol | 1 | 0.79 | 78 |
| 1,3-Propanediol | 52 | 1.06 | 214 |
| Propylene Glycol | 56 | 1.04 | 178 |
| Glycerol | 1200 | 1.26 | 290 |
| Triacetin | 25 | 1.16 | 258 |
| Approximate Physical Properties of Low Water Liquids (at 20° C.) | | | |
| Fructose Solution (77% solids) | 1700 (per spec @60° F.) | 1.39 | Not available |
| Liquid Sucrose (67.5 Brix) | ~295 | 1.33 | — |
| Sorbitol Neosorb (70/90) | 205 | 1.30 | — |
| Sorbitol Neosorb (70/02) | 85 | 1.29 | — |
| Caramel DSL4 | 10-5000 | 1.27 | 100° C. and above |
| Maltitol Syrup (76% maltitol/ 75% dry solids) | 1300 | 1.19 | — |

In general, viscosity of the concentrates increases with increasing amounts of solids dissolved and/or dispersed therein, and with increasing LWL viscosity. Further, viscosity of the concentrates and of the LWL generally decreases with increasing temperature. This property beneficially increases flowability to allow generally higher solids levels to be utilized in concentrates manufactured using heating while also beneficially providing relatively higher viscosity at lower storage and usage temperatures, such as room temperature, to make concentrates less susceptible to spilling or splashing during handling. Advantageously, the concentrates described herein are fluids under conditions of manufacture, storage, and use. Further, the concentrates are not regarded as being gels because they have no, or insignificant, yield stress and no, or insignificant, elasticity.

Further, without wishing to be limited by theory, it is presently believed that higher concentrate viscosity beneficially lowers potential for component interactions via slowing of molecular diffusion and chemical reactions to better preserve initial flavor quality and/or increase concentrate shelf-life. Therefore, selection of the identity as well as amount of LWL, water, and coffee and/or tea solids may be beneficially selected to provide a high enough viscosity to slow molecular diffusion and chemical reactions but low enough to maintain a flowable liquid beverage concentrate.

The viscosity of the concentrates described herein can be measured using established methods, such as using a Brookfield or other viscometer, but need not be routinely analyzed because other properties, such as composition, flavor, and storage stability have greater practical significance, and suitable viscosity is easily recognized from bulk flow characteristics. In some approaches, the viscosity of the concentrates described herein may be about 10 to about 2000 cP, in another aspect about 50 to about 500 cP, as measured at room temperature using a Brookfield viscometer with spindle 00. In some applications, viscosity may beneficially be increased up to about that of molten chocolate or ketchup (i.e., 50,000-100,000 cP), or higher. Generally there are no upper limits on viscosity other than maintaining the ability to pour, scoop, squeeze, squirt, or otherwise dispense the beverage concentrates from containers or packages. At least in some approaches, the viscosity of the concentrates described herein is generally higher than the viscosity of concentrates comprising the same dissolved or dispersed solids, and solids levels, that are formulated with water instead of LWL.

Stability

The low water beverage concentrates described herein can be diluted with a potable liquid to provide a beverage that has substantially the same, or otherwise acceptable, flavor quality and appearance as a beverage prepared from a freshly prepared or frozen concentrate (i.e., within 24 hours of preparation). Such judgments can generally be made by a trained panel or consumer preference testing. For example, the flavor stability of the concentrates can be evaluated a trained panel using the following scale: No Difference (0-1); Slight Difference (2-3); Moderate Difference (4-5); and Large Difference (6-10). Generally, for purposes of assessing the stability of the concentrates, the concentrates are stored for at least 12 weeks, in another aspect at least 6 months, or in another aspect at least 12 months, in closed containers at about 70° F., and a control is stored in a refrigerator (about 40° F.). The concentrates are then diluted by the appropriate dilution factor to provide a ready-to-drink beverage and tasted by the panel. The individual evaluations by each member of the panel are then averaged. A concentrate having an average score of from 6 to 10 is considered to have degraded flavor and be an unsuccessful product. A concentrate having an average score of from 4 to 5 is acceptable but less desirable than a concentrate having an average score of 0 to 4.

Advantageously, the concentrates described herein are more chemically stable at room temperature than an otherwise identical beverage concentrate that includes higher amounts of water. As such, the concentrates described herein are formulated and prepared using the ingredients in the ratios and amounts described herein to provide very desirable flavor quality and longer shelf life compared to an aqueous beverage concentrate having the same amount of coffee and/or tea solids but including water instead of LWL.

In some aspects, it may be desirable to include one or more preservatives. For example, potassium sorbate and/or sodium benzoate may be used to increase the microbial stability of the concentrates when stored at room temperature. In some approaches, the concentrates described herein may be stored at room temperature and remain microbially stable for at least about three months, in another aspect at least six months, in another aspect at least nine months, and in yet another aspect at least twelve months. By "microbially stable" it is meant that the concentrate avoids substantial flavor degradation and is microbially stable such that the concentrate has an aerobic plate count (APC) of less than about 5000 CFU/g, yeast and mold at a level less than about 500 CFU/g, and coliforms at 0 MPN/g when stored at room temperature in a closed container. Although the concentrates described herein do not require refrigerated or frozen storage, such treatment can be used to further increase their shelf life, and the products can be formulated to remain fluid in freezers so that they do not require thawing before use.

Methods for Making the Concentrates

Concentrates having low water content can be provided in a variety of forms and can be prepared by a variety of processes. Concentrates in the form of emulsions, solutions (i.e., in which the ingredients are dissolved in NAL or aqueous liquid included in the concentrate), or suspensions can be prepared by the methods described below. The concentrates described herein can include both water-soluble and water-insoluble ingredients, as well as ingredients that are soluble and insoluble in the selected LWL or water. Other methods for preparing the liquid concentrates having low water content as described herein can also be used, if desired. The following methods are intended to be exemplary but not limiting in scope.

As larger quantities of the coffee and/or tea solids can be solubilized in water, the incorporation of the coffee and/or tea solids into the beverage concentrates can be simplified as compared to incorporating the same amount of coffee and/or tea solids into NAL. For example, the beverage concentrates provided herein can be produced without the need for heating to increase solubility of the coffee and/or tea solids. However, the present methods do not exclude such heating steps and heating steps may be performed, if desired.

In some approaches, the concentrate can be prepared by combining the coffee and/or tea solids with water or LWL. Additional water may also be added, if desired. The coffee and/or tea solids may be dissolved, dispersed, or suspended in water or LWL.

Beverage concentrates comprising an insoluble solids component in the form of a suspended particulate component (e.g., insoluble particles from a solid flavor source or other additive) dispersed in a LWL can be manufactured by grinding or other suitable method of size reduction. By some approaches, the mean particle size of the insoluble solids component in these dispersions is less than about 50 microns, in another aspect less than 10 microns, in another aspect less than 1.0 micron, and in another aspect less than 0.1 micron. The particle size of the insoluble solids component can be reduced by grinding, milling, or any other suitable size reduction method, including, for example, solidifying previously dissolved solids to a desired particle size, before, during, or after addition to the concentrate. Grinding may be accomplished, at least to some extent, by subjecting the solid flavor source to blending, high-shear mixing, homogenization, sonication, or cavitation. The precise conditions used during particle size reduction are not believed to be critical and suitable conditions could readily be determined by one of ordinary skill in the art to provide desired appearance and viscosity, as well as to control the sedimentation rate of solids suspended in the LWL during storage. Particle size reduction, using any suitable method, generally improves the uniformity of the concentrate, which also generally improves the appearance, texture, fluidity, and flowability of the concentrate. Generally, the smaller the particle size, the longer the particles will stay suspended without precipitating. While not wishing to be limited by theory, it is presently believed that reduction of the mean particle size is effective to prolong suspension of the solids component in the LWL sufficient to delay or prevent the precipitation of solid particles during manufacture and storage. In some approaches, a particle size reduction technique can be used to provide a particle size that does not impart a gritty mouthfeel to beverages prepared from the concentrates. Suspensions of solids in liquids are generally known as sols and those having particle size less than about 0.1 micron are generally known as colloidal sols.

For example, a particulate flavor source in the form of roasted coffee particles or tea leaves particles may be added to a beverage concentrate to improve flavor, aroma, appearance, texture, or strength of the concentrate and/or beverages prepared from the concentrate. By some approaches, the beverage concentrate containing the coffee or tea particles also comprises a water-extracted and subsequently dried, or partially dried, coffee or tea extract that has been dissolved or suspended in water or LWL. After addition of the coffee particles or tea leaves, the concentrate may be subjected to homogenization or other method to further improve flowability, reduce viscosity, or slow particle sedimentation.

In some aspects, the beverage concentrates are provided in the form of saturated solutions, and in other aspects supersaturated solutions. Concentrates in the form of saturated or supersaturated solutions provide increased flavor strength and reduced volume to allow use at lower levels when combined with water to prepare beverages, as well as increased viscosity and elimination or reduction of the amount of free water, if any, or other liquids present to beneficially prevent or slow any unwanted chemical reactions or sedimentation.

By another approach, a beverage concentrate can be prepared by a method comprising: providing a solids component comprising a solid flavor source in LWL, the solids component being provided in an amount that exceeds its solubility in the LWL or at a temperature below the melting or softening point of the solids component; heating the solids component to above the melting or softening point to dissolve the melted solids component in the LWL; cooling the LWL containing the dissolved solids under conditions effective to slow or prevent solidification of the melted solids (e.g., for at least about 24 hours, in another aspect at least about one week, and in another aspect at least about one month) to provide the liquid beverage concentrate. Use of a melting or softening point depends on the type of solid flavor source included in the concentrate. For example, instant coffee and tea powers have a softening point while other types of ingredients, like sugars, have a melting point. Conditions effective to slow or prevent solidification include, but are not limited to, use of LWL which decrease molecular mobility as a result of their viscosity being greater than water, to prepare beverage concentrates, slowly cooling after heating the solids component, use of mixtures of solids, and/or use of crystallization inhibitors.

By another approach, a beverage concentrate can be prepared by a method comprising providing a solids component comprising a solid flavor source in water or combination of water and LWL, the solids component being provided in an amount that exceeds its solubility in the LWL at a temperature below the melting or softening point of the solids component; heating the solids component to above the melting or softening point to dissolve the melted solids component in the LWL; and cooling the LWL containing the dissolved solids under conditions effective to form suspended solid particles in the LWL to provide the flavored liquid beverage concentrate.

In both of the above-described approaches involving the melting and/or softening of the solids component, the solids component is included in super saturated amounts in the LWL (i.e., the solids component is included at a concentrate that exceeds its solubility therein at any temperature below their solid melting or softening point). When the solids component includes at least two different ingredients, the solids component is melted at a temperature high enough to melt the ingredient having the highest melting or softening point. The solids component in the LWL is then melted and/or softened by heating to completely dissolve the solids in the LWL to provide a super-saturated melt. The solids are considered to be completely dissolved upon visual inspection.

Extracted flavor components and optional additional ingredients present in melts or suspensions may exist simultaneously in one or more of a dissolved, dispersed, or suspended state in the concentrates. Optional dispersant or crystallization inhibiting ingredients may be added to the LWL before, during, or after any dissolving, heating, or grinding conducted in manufacture. Such substance may be utilized to prevent, reduce, or slow solid nucleation or crystallization, or to limit the size of any crystals or particles formed during concentrate manufacture or storage.

If needed or desired, one or more dispersants or crystallization inhibitors may optionally be added to beverage concentrates to prevent, reduce, or slow nucleation, flocculation, or precipitation of dissolved or suspended components during manufacture or storage. Concentrates may optionally comprise liquid-in-liquid type emulsions and a suitable emulsifier can be added to such products to prevent, reduce, or slow separation of the liquids into discrete layers as may result from the liquids having different densities. For example, coffee oil can be emulsified into a beverage concentrate comprising glycerol, or other LWL, and extracted roasted coffee solids, or other solid flavor source, to create a liquid-in-liquid emulsion.

During manufacture of the beverage concentrates described herein, the rate of extraction or dissolution of any component from the solid flavor source may be increased by optionally heating the LWL to a temperature between room temperature and its boiling point (if it has one) before or during extraction or dissolution. It may also be desirable in some approaches to heat the solid flavor source to its softening point to increase its rate of extraction or dissolution. In some aspects, heated mixtures of extracted flavor components dissolved or suspended in LWL are first cooled to room temperature prior to addition of any heat sensitive ingredients, such as flavors and/or aromas, to the mixtures to minimize undesirable chemical reactions and flavor changes.

Any of the additional ingredients included may be subjected to heating, grinding, softening or melting, or subsequently added to prepared solutions, suspensions, or cooled melts to minimize the volume of material processed in manufacturing and to minimize the potential for unwanted reactions. In some aspects, the additional ingredients may also be added to LWL before or after heating, in any manner effective to limit their own degradation or potential reaction with extracted flavor components, as may be readily determined by one skilled in the art of food processing.

Preparing Coffee and/or Tea Solids

In some approaches, the coffee and/or tea solids may be provided as a coffee or tea solid flavor source in a variety of forms, including, for example, coffee beans, tea (green, black, red, or white) leaves or twigs, seeds, roots, flowers, twigs, stalks, barks, pods, buds, peels, and needles. Further, the solids may be brewed, or otherwise utilized, in any raw, dried, roasted, or fermented form, in whole or comminuted state, according to various methods disclosed herein. Other non-coffee and non-tea solid flavor sources may also be used, such as cinnamon bark, ginger root, clove buds, cardamom pods, rosemary needles, orange peels, hibiscus, chamomile, or rose flowers, lemongrass stalks, cocoa nibs, yerba mate, chicory, and other seeds, roots, flowers, twigs, stalks, barks, pods, buds, peels, needles, and combinations thereof.

By some approaches, a brewed extract of a solid flavor source can be prepared for use in the concentrates herein. The method includes brewing or otherwise extracting the solid flavor source using a liquid to provide an extract of the solid flavor source containing chemical constituents present in the flavor source which collectively comprise flavor and/or aroma characteristic of the flavor source. The term "brewing" is intended to mean steeping, mixing, or otherwise effectively contacting the solid flavor source in the liquid so as to extract at least a portion (in one aspect at least about 5 percent, in another aspect at least about 10 percent, in another aspect at least about 30 percent, in another aspect at least about 40 percent, and in yet another aspect at least about 50) of those chemical constituents present in the flavor source that are soluble and/or dispersible in the liquid, and which collectively comprise flavor and/or aroma characteristic of the flavor source.

The method of brewing the solid flavor source is not particularly limited and any suitable method and operating pressure, with or without heating, using water, LWL, or combinations thereof can be used. In one aspect, the botanical solid flavor source is brewed in a liquid comprising a LWL for a time and at a temperature effective to extract chemical constituents that are soluble and/or dispersable in the LWL from the solid flavor source, where the chemical constituents collectively comprise flavor and/or aroma characteristic of the flavor source. The LWL containing the extracted chemical constituents are then separated from the remainder of the solid flavor source, which can be considered a spent solid flavor source, to provide a brewed, non-aqueous botanical extract. By one approach, the extract can be separated from the remainder of the solid flavor source by filtration.

By one approach, if the flavor source is brewed with water or a LWL to provide a flavor source extract containing chemical constituents that collectively comprise flavor and/or aroma characteristic of the flavor source, the extract prepared from the flavor source may be partially or completely dehydrated or concentrated using any suitable method such as, but not limited to, evaporation, distillation, membrane filtration, spray-drying, freeze-concentration or freeze-drying, before or after combining the extract with LWL, water, or combination thereof to prepare a liquid beverage concentrate as described herein.

In some approaches, the solid flavor source can be extracted with water and the resulting aqueous extract concentrated and/or dried, before or after combining the extract with a LWL. In some aspects, an NAL added to the extract is a NV-NAL. In another form, the flavor source can be extracted with one or more V-NAL, NV-NAL, LWL, or any mixture thereof. Any V-NAL used in the extraction may be partially or completely removed from the extract, such as by evaporation, distillation, filtration, or drying.

In yet another aspect, vapors produced during removal of water and/or V-NAL from extracts, or by contacting the flavor source with LWL, may be collected, such as by low-temperature condensation, and subjected to any separation, fractionation, or purification process effective to recover volatile compounds derived from the flavor source for addition to beverage concentrates to modify or improve perceived quality of flavor and/or aroma. Optionally, volatile compounds derived from the flavor source may be directly condensed into one or more LWL to provide a source of flavor and/or aroma for use in the beverage concentrates described herein.

Packaging and Dispensing

The concentrates may be packaged and dispensed in any manner, such as from a bottle or other multi-serve container, from a single-serve pod or capsule, from a bulk package such as a bag-in-box container, or from a vending machine. Pre-measured bags or envelopes appropriately sized for addition to standard hot-water urns or other foodservice devices may be produced to improve user convenience and better control of beverage strength. Two or more packaged concentrates may be dispensed together, in any suitable manner, to prepare a single beverage or other food product.

Further, for example, a foodservice operator could prepare a coffee concentrate using a soluble coffee powder, LWL, and water to provide a convenient liquid form of coffee that can be easily dispensed from a container or vending machine over the course of a dining event, a weekend event, or a week-long event without producing substantial loss of flavor quality or sedimentation during that time.

Advantages and embodiments of the concentrate compositions described herein are further illustrated by the following examples; however, the particular conditions, processing schemes, materials, and amounts thereof recited in these examples, as well as other conditions and details, should not be construed to unduly limit the compositions and methods described herein. All percentages in this application are by weight unless otherwise indicated.

EXAMPLES

Example 1. Concentrates Made with Spray-Dried Soluble Coffee Powder

In this example, increasing quantities of water were replaced with glycerol (NAL) at time zero to identify impact of NAL content on the initial pH of a concentrate containing Maxwell House spray-dried soluble coffee powder. The results are presented in Table II below.

TABLE II

| 20% Maxwell House Coffee Solubilized in Various amounts of Water and Glycerol | | | |
|---|---|---|---|
| Coffee (%) | Glycerol (%) | Water (%) | pH |
| 20 | 0 | 80 | 4.69 |
| 20 | 20 | 60 | 4.75 |
| 20 | 40 | 40 | 4.81 |
| 20 | 50 | 30 | 4.87 |
| 20 | 60 | 20 | 4.93 |
| 20 | 70 | 10 | 5.00 |

As can be seen above, as larger amounts of glycerol replace water in the formulations, the initial pH is higher due to less dissociation of acids from the soluble coffee.

Example 2. Storage Study for Mocha-Flavored Coffee Concentrates

A storage study was conducted for mocha-flavored coffee concentrates (120×) prepared with coffee solids (spray-dried), glycerol, water, flavoring, sweetener, and added acid according to the formulations of Table III below. Acids were added to target a pH of about 4.3.

TABLE III

| Mocha-Flavored Coffee Concentrates | | | | |
|---|---|---|---|---|
| Ingredients | Mocha Citric (%) | Mocha Lactic (%) | Mocha Propionic (%) | Mocha GDL (%) |
| Water | 20.45 | 19.55 | 12.95 | 17.85 |
| Coffee solids (spray-dried) | 22.7 | 22.7 | 22.7 | 22.7 |
| Glycerol | 30.0 | 30.0 | 30.0 | 30.0 |
| Mocha flavor | 22.0 | 22.0 | 22.0 | 22.0 |
| Sucralose (dry) | 1.5 | 1.5 | 1.5 | 1.5 |
| Ace-K | 0.8 | 0.8 | 0.8 | 0.8 |

TABLE III-continued

Mocha-Flavored Coffee Concentrates

| Citric acid | 1.4 | 0 | 0 | 0 |
|---|---|---|---|---|
| Lactic acid (88%) | 0 | 2.3 | 0 | 0 |
| Propionic acid | 0 | 0 | 8.9 | 0 |
| Glucono delta lactone (GDL) | 0 | 0 | 0 | 4.0 |
| Gluconic acid (50%) | 0 | 0 | 0 | 0 |
| Malic acid | 0 | 0 | 0 | 0 |
| Phosphoric acid (85%) | 0 | 0 | 0 | 0 |
| Potassium citrate | 0.7 | 0.7 | 0.7 | 0.7 |
| Caramel coloring | 0.4 | 0.4 | 0.4 | 0.4 |
| Potassium Sorbate | 0.05 | 0.05 | 0.05 | 0.05 |

| Ingredients | Mocha Gluconic (%) | Mocha Malic (%) | Mocha Phosphoric (%) | Mocha No Acid Control (%) |
|---|---|---|---|---|
| Water | 12.95 | 20.35 | 20.65 | 21.85 |
| Coffee solids (spray-dried soluble coffee) | 22.7 | 22.7 | 22.7 | 22.7 |
| Glycerol | 30.0 | 30.0 | 30.0 | 30.0 |
| Mocha flavor (propylene glycol-based flavor) | 22.0 | 22.0 | 22.0 | 22.0 |
| Sucralose (dry) | 1.5 | 1.5 | 1.5 | 1.5 |
| Ace-K | 0.8 | 0.8 | 0.8 | 0.8 |
| Citric acid | 0 | 0 | 0 | 0 |
| Lactic acid (88%) | 0 | 0 | 0 | 0 |
| Propionic acid | 0 | 0 | 0 | 0 |
| Glucono delta lactone (GDL) | 0 | 0 | 0 | 0 |
| Gluconic acid (50%) | 8.9 | 0 | 0 | 0 |
| Malic acid | 0 | 1.5 | 0 | 0 |
| Phosphoric acid (85%) | 0 | 0 | 1.2 | 0 |
| Potassium citrate | 0.7 | 0.7 | 0.7 | 0.7 |
| Caramel coloring | 0.4 | 0.4 | 0.4 | 0.4 |
| Potassium Sorbate | 0.05 | 0.05 | 0.05 | 0.05 |

The samples were stored for 12 weeks at 90° F. and analyzed for pH change, titratable acid (TA), and sensory differences compared to controls stored in closed containers at 40° F. (DoD; degree of difference). The data is presented in Tables IV and V below. The pH was measured in the concentrate, while TA was measured by diluting the concentrate in water at a ratio of 1:120 to provide a ready-to-drink (RTD) beverage that was then tasted by the panel.

TABLE IV

TA, pH and Sensory Changes for Non-Acidified Coffee Concentrate (120X) Samples at Time Zero and 12 Weeks at 90° F.

| Non-Acidified Coffee Concentrate | pH (conc.) | TA (RTD) | DoD (degree of difference)* |
|---|---|---|---|
| Time Zero | 5.09 | 0.017% | 0.0 |
| 12 Weeks at 90° F. | 4.96 | 0.017% | 3.2 |

*DoD Scale: 0-1 No Difference; 2-3 Slight Difference; 4-5 Moderate Difference; 6-10 Large Difference

TABLE V

TA, pH and Sensory Changes for Acidified (Malic Acid) Coffee Concentrate (120X) Samples at Time Zero and 12 Weeks at 90° F.

| Acidified Coffee Concentrate (Malic Acid) | pH (conc.) | TA (RTD) | DoD (degree of difference)* |
|---|---|---|---|
| Time Zero | 4.33 | 0.031% | 0.0 |
| 12 Weeks at 90° F. | 4.36 | 0.029% | 2.29 |

*DoD Scale: 0-1 No Difference; 2-3 Slight Difference; 4-5 Moderate Difference; 6-10 Large Difference The results can be seen in Table IV for the non-acidified samples and in Table V for the samples acidified with malic acid. As can be seen in Table IV, there is a very slight drop in pH for the non-acidified samples over 12 weeks and no change in TA. According to Tonyes at al. in U.S. Pat. No. 8,277,864 B2, the average drop in pH for coffee concentrates (containing approximately 25% coffee solids) after 12 weeks at 90° F. is about 0.5 pH units. In contrast, we surprisingly observed a pH drop of only 0.13 units. Further, the DoD score for the non-acidified samples is only 3.2. After the 12 week storage, the main difference observed by the sensory panel was "less mocha flavor" but there was no mention of off-flavors, which is commonly noted for coffee concentrates made with water as the only solvent.

The results for the samples acidified with malic acid, shown in Table V, were even less different compared to the non-acidified samples. During the 12 weeks storage at 90° F., it was very surprisingly that the pH slightly increased (by 0.03 pH units), the TA slightly decreased (0.002%), and the sensory panelists gave a DoD score of only 2.29. Again, the main difference observed by the sensory panelists was that the samples had "slightly less mocha flavor."

The other acidified samples gave DoD scores as follows: phosphoric (4.6); citric (1.57); gluconic (3.14); GDL (3.6); and lactic (5.2). The concentrate acidified with propionic acid was undesirably sour after one week of storage and was not further evaluated. These results indicate that certain acids may provide more desirable taste profiles than others. For example, concentrates acidified with citric acid were less different from control than the concentrates acidified with lactic acid.

Example 3. Storage Study for Coffee Concentrates

Another storage study was conducted for 70× coffee concentrates made with various coffee types and solvent combinations, including glycerol, water, sorbitol, liquid fructose, and honey, as shown in Table VI below. Coffee solids were added at 11 percent for all samples except for one, which had coffee solids at 20 percent ("MXH II"). The concentrates included soluble coffees (Paraiba (spray dried), Santos (freeze dried), or Maxwell House (spray dried)).

The samples were stored for 12 weeks at 0° F., 70° F., and 90° F. and evaluated for pH, titratable acid (TA), and sensory differences. The results are presented in Table VII.

TABLE VI

Liquid Coffee Concentrates (70x)

| | A | B | C | D | E | F | G |
|---|---|---|---|---|---|---|---|
| | | | | Description | | | |
| Ingredients | Paraiba w/ Fructose % | Paraiba w/ Honey % | Paraiba w/ Sorbitol % | Santos w/ Fructose % | Santos w/ Sorbitol % | MXH w/ Fructose % | MXH II w/ Fructose % |
| Glycerol | 32.7350 | 32.7350 | 33.4750 | 32.7350 | 33.4750 | 32.7350 | 28.1600 |
| Liquid Fructose | 32.7600 | 0.0000 | 0.0000 | 32.7600 | 0.0000 | 32.7600 | 28.9700 |
| Honey | 0.0000 | 32.7600 | 0.0000 | 0.0000 | 0.0000 | 0.0000 | 0.0000 |
| Sorbitol* | 0.0000 | 0.0000 | 22.0200 | 0.0000 | 22.0200 | 0.0000 | 0.0000 |
| Sorbitol Powder | 0.0000 | 0.0000 | 10.0000 | 0.0000 | 10.0000 | 0.0000 | 0.0000 |
| Water | 22.5000 | 22.5000 | 22.5000 | 22.5000 | 22.5000 | 22.5000 | 21.8650 |
| Paraiba | 11.0000 | 11.0000 | 11.0000 | 0.0000 | 0.0000 | 0.0000 | 0.0000 |
| Santos | 0.0000 | 0.0000 | 0.0000 | 11.0000 | 11.0000 | 0.0000 | 0.0000 |
| Maxwell House | 0.0000 | 0.0000 | 0.0000 | 0.0000 | 0.0000 | 11.0000 | 20.0000 |
| Sucralose (dry) | 0.4500 | 0.4500 | 0.4500 | 0.4500 | 0.4500 | 0.4500 | 0.4500 |
| Ace-K | 0.2300 | 0.2300 | 0.2300 | 0.2300 | 0.2300 | 0.2300 | 0.2300 |
| Caramel coloring | 0.2500 | 0.2500 | 0.2500 | 0.2500 | 0.2500 | 0.2500 | 0.2500 |
| Potassium Sorbate | 0.0750 | 0.0750 | 0.0750 | 0.0750 | 0.0750 | 0.0750 | 0.0750 |
| SUM: | 100.0000 | 100.0000 | 100.0000 | 100.0000 | 100.0000 | 100.0000 | 100.0000 |

*Sorbitol (70/90) is a polyol solution with approximately 70% solids and 30% water. The solids include about 70% sorbitol and 25% other polyols, including about 20% maltitol, about 5% mannitol, and the remainder being higher hydrogenated polysaccharides.

TABLE VII pH and TA changes for Coffee Concentrate over 12 weeks of storage

| | Coffee Concentrates | | | |
|---|---|---|---|---|
| Variant | 12 Weeks at 0° F. pH (conc.) | 12 Weeks at 90° F. pH (conc.) | 12 Weeks at 0° F. TA (RTD) | 12 Weeks at 90° F. TA (RTD) |
| A - Paraiba w/ Fructose | 4.77 | 4.68 | 0.011 | 0.012 |
| B - Paraiba w/ Honey | 4.70 | 4.63 | 0.011 | 0.011 |
| C - Paraiba w/ Sorbitol | 4.83 | 4.76 | 0.010 | 0.010 |
| D - Santos w/ Fructose | 4.93 | 4.77 | 0.010 | 0.011 |
| E - Santos w/ Sorbitol | 4.95 | 4.86 | 0.009 | 0.010 |
| F - MXH w/ Fructose | 4.82 | 4.69 | 0.010 | 0.011 |
| G - MXH II w/ Fructose | 4.79 | 4.68 | 0.018 | 0.019 |

The difference in pH drop of the samples stored at 90° F. for 12 weeks as compared to the control samples stored at 0° F. was very slight (around ~0.11 pH units on average). Also, the change in TA was insignificant.

Sensory analysis (DoD) was also performed for sample G after 9 weeks of storage and Samples A, D, and F after 12 weeks of storage. Results are presented in Table VIII.

TABLE VIII

Sensory Results via Degree of Difference

| Coffee Concentrates | Degree of Difference: 0° F. vs. 90° F. |
|---|---|
| A - Paraiba w/ Fructose | 2.33 (12 weeks) |
| D - Santos w/ Fructose | 2.17 (12 weeks) |
| F - MXH w/ Fructose | 2.00 (12 weeks) |
| G - MXH II w/ Fructose (note: evaluated at 9 weeks) | 2.00 (9 weeks) |

*DoD Scale: 0-1 No Difference; 2-3 Slight Difference; 4-5 Moderate Difference; 6-10 Large Difference As can be seen in Table VIII above, there is little sensory difference noted between the samples stored at 90° F. and controls at 0° F. There was no mention of off-flavor or off-notes, such as raisin notes, which is often noted for coffee concentrates made with water as the only solvent.

The results demonstrate that lowering the water content of the coffee concentrates by substituting water with LWL will enhance the overall flavor quality of the coffee concentrates by slowing down flavor degradation and the formation of off-flavors that are typically seen for coffee concentrates made with water as the only solvent.

Example 4. Coffee Concentrate Formulations

An exemplary coffee concentrate formulation with a 50× concentration factor is provided below in Table IX. Ranges for each ingredient are also provided.

TABLE IX

Coffee Concentrates

| Ingredients | Exemplary Formulation (50X) (%) | Low (%) | High (%) |
|---|---|---|---|
| Glycerol (glycerin) | 22.08 | 0.0 | 50.0 |
| Liquid fructose | 22.3 | 0.0 | 50.0 |
| Liquid sucrose | 0.0 | 0.0 | 50.0 |
| Water | 16.04 | 5.0 | 30.0 |

TABLE IX-continued

Coffee Concentrates

| Ingredients | Exemplary Formulation (50X) (%) | Low (%) | High (%) |
|---|---|---|---|
| Coffee solids (spray dried) | 25.0 | 8.0 | 32.0 |
| Coffee flavor | 0.0 | 0.0 | 20.0 |
| Other flavoring (e.g., vanilla, hazelnut) | 0.0 | 0.0 | 20.0 |
| Sucralose (dry) | 0.07 | 0.0 | 1.5 |
| Ace-K | 0.03 | 0.0 | 1.5 |
| Caramel color, class IV (low 4MeI) | 14.41 | 0.0 | 20.0 |
| Potassium sorbate | 0.07 | 0.0 | 0.1 |
| Sodium benzoate | 0.0 | 0.0 | 0.1 |
| Salt (NaCl) | 0.0 | 0.0 | 10.0 |
| Sum | 100.000 | 100.00 | 100.00 |

Example 5. Flavored Coffee Concentrate Formulations

Exemplary coffee concentrate formulations with a concentration factor ranging from 30× to 120× are provided below in Table X.

TABLE X

Coffee Concentrates

| Ingredients | 120x | 90x | 80x | 70x | 65x | 60x | 30x |
|---|---|---|---|---|---|---|---|
| Glycerol | 18.07 | 23.249 | 24.949 | 26.674 | 27.522 | 28.389 | 33.549 |
| Sorbitol | 18.07 | 23.249 | 24.949 | 26.674 | 27.522 | 28.389 | 33.549 |
| Water | 22.534 | 22.534 | 22.534 | 22.534 | 22.534 | 22.534 | 22.534 |
| Coffee solids | 17.018 | 12.748 | 11.345 | 9.923 | 9.224 | 8.509 | 4.255 |
| Flavor | 22.0 | 16.480 | 14.667 | 12.828 | 11.924 | 11.0 | 5.5 |
| Sucralose (dry) | 1.222 | 0.915 | 0.815 | 0.712 | 0.662 | 0.611 | 0.305 |
| Ace-K | 0.633 | 0.474 | 0.422 | 0.369 | 0.343 | 0.316 | 0.158 |
| Caramel IV Low 4MeI | 0.404 | 0.302 | 0.269 | 0.235 | 0.219 | 0.202 | 0.101 |
| K-Sorbate | 0.05 | 0.05 | 0.05 | 0.05 | 0.05 | 0.05 | 0.05 |
| Sum | 100.0 | 100.0 | 100.0 | 100.0 | 100.0 | 100.0 | 100.0 |

Example 6. Flavored Coffee Concentrate Formulations

Exemplary coffee concentrates were prepared as shown below in Table XI. The concentrates were prepared in 10× formulations in 22.5 mL quantities. The concentrates can be diluted in water at a 1:10 ratio to provide a coffee beverage.

TABLE XI

Coffee Concentrates

| Ingredients | A | B | C | D | E | F | G |
|---|---|---|---|---|---|---|---|
| Glycerol | 29.6 | 29.7 | 20 | 20 | 21 | 21 | 21 |
| Sucrose (liquid; about 67.5% solids) | 35.6 | 35.7 | 22 | 22 | 22 | 24 | 24 |
| Fructose (liquid; about 80% solids) | — | — | 21 | 21 | 20 | 18 | 18 |
| Water | 26.6 | 25.3 | 28.8 | 27.7 | 25.8 | 27.2 | 25.8 |
| Coffee solids (Maxwell House US-IMH) | 8.1 | 9.2 | 8.1 | 9.2 | 9.2 | 8.1 | 9.2 |
| Flavor (contains glycerol) | — | — | — | — | 1.9 | 1.6 | 1.9 |
| K-Sorbate | 0.1 | 0.1 | 0.1 | 0.1 | 0.1 | 0.1 | 0.1 |
| Sum | 100.0 | 100.0 | 100.0 | 100.0 | 100.0 | 100.0 | 100.0 |

TABLE XI-continued

Coffee Concentrates

| Ingredients | A | B | C | D | E | F | G |
|---|---|---|---|---|---|---|---|
| Brix | 56.27 | 57.48 | — | — | — | — | — |
| TA | 0.391% | 0.346% | — | — | — | — | — |
| pH | 4.89 | 4.88 | — | — | — | — | — |
| Aw | 0.789 | 0.783 | — | — | — | — | — |
| Density at 20° C. | 1.22 | 1.22 | 1.22 | 1.22 | 1.22 | 1.22 | 1.22 |
| Viscosity (cP) at 20° C., spindle 00 (Brookfield viscometer) | — | — | 77.4 at 10 rpm; 76.8 at 20 rpm | 99.2 at 10 rpm; 98.6 at 20 rpm | 105 at 10 rpm; 103.4 at 20 rpm | 107.5 at 10 rpm; 106.6 at 20 rpm | 121 at 10 rpm; 120 at 20 rpm |

The foregoing descriptions are not intended to represent the only forms of the concentrates in regard to the details of formulation. The percentages provided herein are by weight unless stated otherwise. Changes in form and in proportion of parts, as well as the substitution of equivalents, are contemplated as circumstances may suggest or render expedient. Similarly, while concentrates and methods have been described herein in conjunction with specific embodiments, many alternatives, modifications, and variations will be apparent to those skilled in the art in light of the foregoing description.

What is claimed is:

1. A low water liquid beverage concentrate comprising:
   about 15 to about 40 percent total water by weight of the concentrate;
   about 20 to about 80 percent low water liquid by weight of the concentrate; and
   about 5 to about 60 percent coffee and/or tea solids by weight of the concentrate,
   the amount of water, low water liquid, and coffee and/or tea solids effective to provide a low water liquid beverage concentrate having a pH between about 3.0 to about 6.0, the pH of the low water liquid beverage concentrate changing less than about 0.5 pH units after 12 months storage at 70° F. in a closed container,
   wherein the low water liquid comprises at least one of fructose syrup, glucose syrup, sucrose syrup, lactose syrup, carbohydrate syrup, honey, agave syrup, monosaccharide, disaccharide, and combinations thereof.

2. The low water liquid beverage concentrate of claim 1, wherein the concentrate comprises about 20 to about 70 percent low water liquid by weight of the concentrate.

3. The low water liquid beverage concentrate of claim 1, wherein the low water liquid further comprises at least one non-aqueous liquid of the group consisting of sugar alcohol, glycerol, propylene glycol, 1,3-propanediol, ethanol, triacetin, ethyl acetate, benzyl alcohol, vegetable oil, vitamin oil, and isopropanol.

4. The low water liquid beverage concentrate of claim 1, wherein the coffee and/or tea solids comprise at least one of the group consisting of freeze-dried coffee, spray-dried coffee, spray-dried tea, freeze dried tea, roast coffee, instant coffee powder, instant tea powder, roasted ground coffee beans, cold brewed tea solids, cold brewed coffee solids, micro grind coffee, agglomerated coffee solids, coffee extract, tea extract, botanical extract, ground tea leaves, and combinations thereof.

5. The low water liquid beverage concentrate of claim 1, wherein the coffee and/or tea solids comprise spray-dried coffee.

6. The low water liquid beverage concentrate of claim 1, wherein the concentrate comprises about 10 to about 40 percent coffee and/or tea solids.

7. The low water liquid beverage concentrate of claim 1, wherein the concentrate comprises about 10 to about 30 percent coffee and/or tea solids by weight of the concentrate.

8. The low water liquid beverage concentrate of claim 1, wherein the concentrate includes about 15 to about 70 percent total solids by weight of the concentrate.

9. The low water liquid beverage concentrate of claim 1, wherein the concentrate further comprises up to about 5 percent high intensity, non-nutritive sweetener solids by weight of the concentrate.

10. The low water liquid beverage concentrate of claim 1, wherein the concentrate has a total water content of about 25 to about 40 percent by weight of the concentrate.

11. A low water liquid beverage concentrate comprising:
    about 25 percent to about 60 percent total water by weight of the concentrate;
    about 20 to about 70 percent low water liquid, the low water liquid comprising at least one of fructose syrup, glucose syrup, sucrose syrup, lactose syrup, carbohydrate syrup, honey, agave syrup, monosaccharide, disaccharide, and combinations thereof, and the low water liquid also comprising at least one of sugar alcohol, glycerol, propylene glycol, 1,3-propanediol, ethanol, triacetin, ethyl acetate, benzyl alcohol, vegetable oil, vitamin oil, and isopropanol;
    about 15 to about 70 percent total solids by weight of the concentrate; and
    about 5 to about 60 percent coffee and/or tea solids by weight of the concentrate,
    the amount of water, total solids, and coffee and/or tea solids effective to provide a low water liquid beverage concentrate having a water activity of about 0.6 to about 0.95 and a pH between about 3.0 to about 6.0, and the amount of water, total solids, and coffee and/or tea solids effective to prevent the pH of the low water liquid beverage concentrate from changing more than about 0.5 pH units after 12 months storage at 70° F. in a closed container.

12. The low water liquid beverage concentrate of claim 11, wherein the coffee and/or tea solids comprise spray-dried coffee.

13. The low water liquid beverage concentrate of claim 11, wherein the concentrate comprises about 10 to about 40 percent coffee and/or tea solids by weight of the concentrate.

14. The low water liquid beverage concentrate of claim 11, wherein the concentrate comprises about 10 to about 30 percent coffee and/or tea solids by weight of the concentrate.

15. The low water liquid beverage concentrate of claim 11, wherein the concentrate has a total solids content of about 30 to about 70 percent by weight of the concentrate.

16. The low water liquid beverage concentrate of claim 11, wherein the concentrate includes coffee solids and does not include tea solids.

17. The low water liquid beverage concentrate of claim 11, wherein the concentrate includes water, total solids, and coffee and/or tea solids in amounts effective to provide the concentrate with a pH that changes fewer than about 0.1 pH units.

18. The low water liquid beverage concentrate according to claim 11, wherein the concentrate has a water activity of about 0.65 to about 0.85 and a pH of about 4.5 to about 5.5, wherein the pH is measured within one day of the beverage concentrate being produced and stored in a closed container at 70° F.

19. A method of preparing a low water liquid beverage concentrate, the method comprising:
providing a pre-concentrate comprising coffee and/or tea solids in water; and
mixing about 10 to about 75 percent by weight pre-concentrate by weight of the low water liquid beverage concentrate with about 25 to about 90 percent by weight low water liquid by weight of the low water concentrate,
the amount of pre-concentrate and low water liquid effective to provide a low water liquid beverage concentrate having about 15 to about 40 percent total water, a pH between about 3.0 to about 6.0, and the pH of the low water liquid beverage concentrate changing fewer than about 0.5 pH units after 3 months storage at 70° F. in a closed container,
the low water liquid comprising at least one of fructose syrup, glucose syrup, sucrose syrup, lactose syrup, carbohydrate syrup, honey, agave syrup, monosaccharide, disaccharide, and combinations thereof, and
the low water liquid also comprising at least one of sugar alcohol, glycerol, propylene glycol, 1,3-propanediol, ethanol, triacetin, ethyl acetate, benzyl alcohol, vegetable oil, vitamin oil, and isopropanol.

20. The method of claim 19, wherein the low water liquid beverage concentrate includes about 5 to about 60 percent coffee and/or tea solids by weight of the liquid beverage concentrate.

21. The method of claim 19, wherein the concentrate includes about 15 to about 70 percent by weight total solids.

22. The method of claim 19, wherein the low water liquid beverage concentrate has a total water content of about 25 to about 40 percent by weight of the concentrate.

23. The method of claim 19, wherein the low water liquid is included in an amount of about 20 to about 80 percent by weight of the concentrate.

24. The method of claim 19, wherein the concentrate further comprises up to about 5 percent high intensity, non-nutritive sweetener solids.

* * * * *